Figure 1:
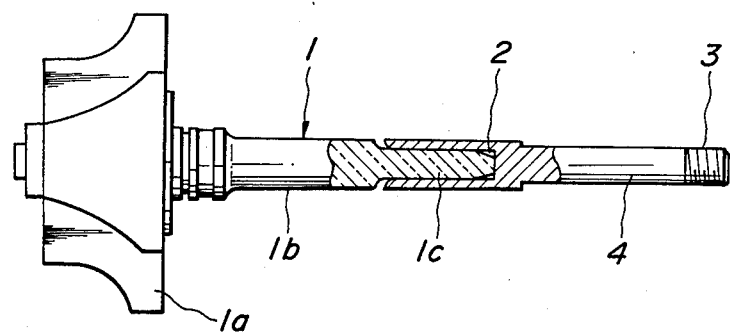
Figure 2:
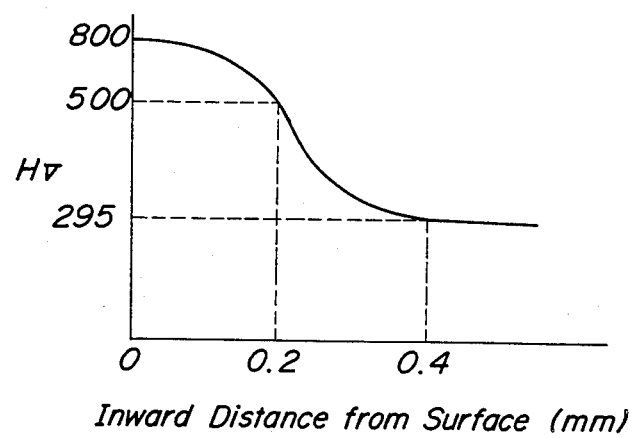
Figure 3:
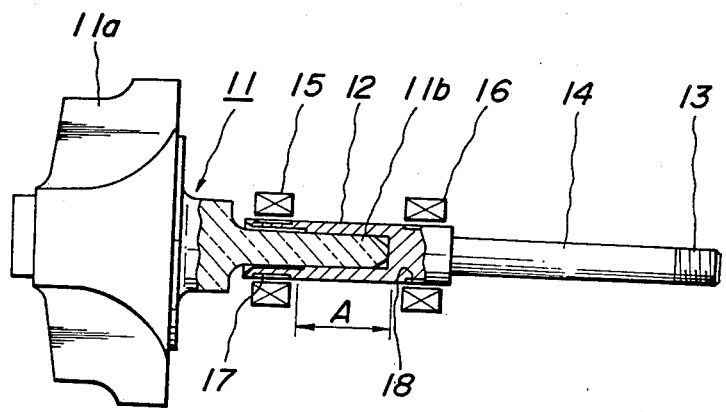
Figure 4:
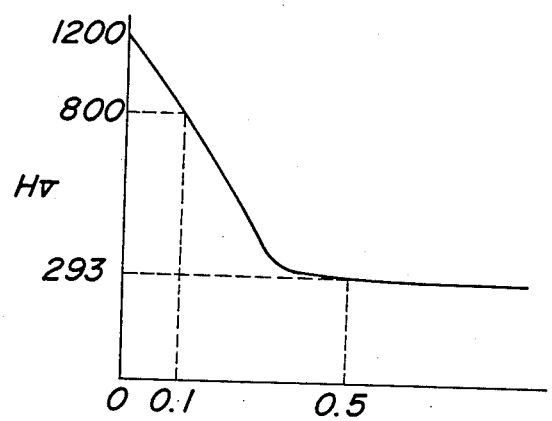
Figure 5:
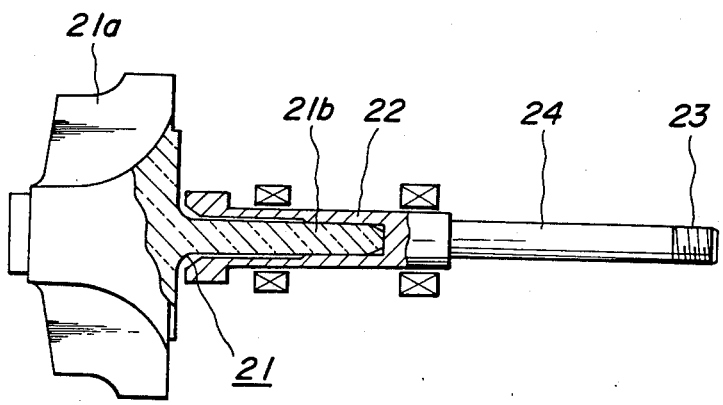

United States Patent [19]

Oda et al.

[11] Patent Number: 4,761,117
[45] Date of Patent: Aug. 2, 1988

[54] TURBINE ROTOR AND A METHOD OF PRODUCING THE SAME

[75] Inventors: Isao Oda, Nagoya; Nobuo Tsuno, Kasugai, both of Japan

[73] Assignee: NGK Insulators, Ltd., Japan

[21] Appl. No.: 867,538

[22] Filed: May 28, 1986

[30] Foreign Application Priority Data

Jun. 12, 1985 [JP] Japan .................. 60-126293

[51] Int. Cl.⁴ .................................. F01D 5/28
[52] U.S. Cl. .................. 416/241 R; 416/241 B
[58] Field of Search ............ 148/144; 416/241 B, 416/241 R, 244 A, 213 R; 228/122, 124, 135, 231; 417/407; 415/212, 214

[56] References Cited

U.S. PATENT DOCUMENTS

| | | | |
|---|---|---|---|
| 3,108,913 | 10/1963 | Sommer | 148/146 |
| 3,604,819 | 9/1971 | Krahe et al. | 416/244 R X |
| 3,801,226 | 4/1974 | Bevan et al. | 416/241 B |
| 4,123,199 | 10/1978 | Shimizu et al. | 416/244 A |
| 4,256,441 | 3/1981 | Arora | 417/407 |
| 4,281,941 | 8/1981 | Rottenkolber | 403/29 |
| 4,424,003 | 1/1984 | Brobeck | 416/241 B |
| 4,479,293 | 10/1984 | Miller et al. | 29/156.8 R |
| 4,479,735 | 10/1984 | Thompson et al. | 403/28 |
| 4,486,147 | 12/1984 | Byrne et al. | 416/241 B X |
| 4,557,704 | 12/1985 | Ito et al. | 416/241 B X |
| 4,585,396 | 4/1986 | Kawamura et al. | 416/241 B |
| 4,614,453 | 9/1986 | Tsuno et al. | 416/241 B X |

FOREIGN PATENT DOCUMENTS

| | | |
|---|---|---|
| 2734747 | 2/1979 | Fed. Rep. of Germany . |
| 3343203 | 11/1982 | Fed. Rep. of Germany . |
| 103902 | 6/1984 | Japan ................. 416/241 B |

Primary Examiner—Robert E. Garrett
Assistant Examiner—Joseph M. Pitko
Attorney, Agent, or Firm—Parkhurst & Oliff

[57] ABSTRACT

A turbine rotor including a turbine vane wheel made of ceramics, a ceramic shaft formed integrally with the turbine wheel, and a metallic shaft bonded to the ceramic shaft. The hardness of a part of or the whole part of a compressor wheel-fitting shaft portion of the metallic shaft is made smaller than that of a portion of metallic shaft apart from the compressor wheel-fitting shaft, said portion being located on the turbine vane wheel side. Thereby, slackening between the compressor wheel and the fitting shaft is avoided. Methods of producing the turbine rotor are also disclosed.

7 Claims, 4 Drawing Sheets

Inward Distance from Surface (mm)

Inward Distance from Surface (mm)

TURBINE ROTOR AND A METHOD OF PRODUCING THE SAME

BACKGROUND OF THE INVENTION

1. Field of the Invention

The present invention relates to a ceramic-metal composite body, and more specifically the invention relates to a turbine rotor and a method of producing the same.

2. Related Art Statement

Since ceramics such as zirconia, silicon nitride and silicon carbide are excellent in mechanical strength, heat resistance and wear resistance, they have attracted attention as high temperature structural materials and wear resistive materials for gas turbine engine parts, engine parts and so on. However, the ceramics are inferior to the metallic materials in terms of shape formability because they are hard and brittle. Further, ceramics have weak resistance against impact forces due to their poor toughness. For this reason, it is difficult to form mechanical parts such as the engine parts only from the ceramic materials, and they are generally used in a composite structural body in which a metallic member is bonded to a ceramic member.

Figure 6:
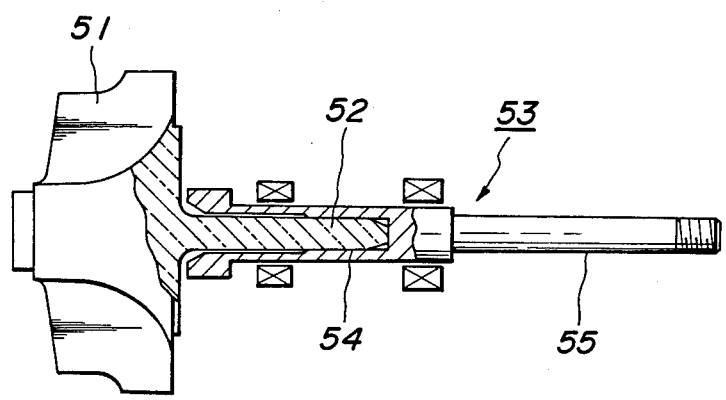

Heretofore, turbine rotors have been known as metal-ceramic composite bodies of this kind. FIG. 6 is a partial sectional view showing an example of such a turbine rotor. In FIG. 6, the turbine rotor is integrally formed by fitting a ceramic shaft 52 integrally formed with a turbine vane wheel 51 made of ceramics into a depression 54 of a metallic member 53. The fitting is ordinarily carried out through press fitting, shrink fitting, or expansion fitting. A fitting shaft 55 for mounting a compressor wheel not shown is provided on an opposite side to the turbine vane wheel side of the metallic member 53.

3. Problems to be solved by the Present Invention

The above-mentioned turbine rotor has been heretofore used in the state that the whole metallic member 53 had the same high hardness or only a part of the outer periphery of the depression-provided portion which was to be brought into contact with a bearing was further hardened. Therefore, the shaft 55 for fitting a compressor wheel had a high hardness.

Figure 7:
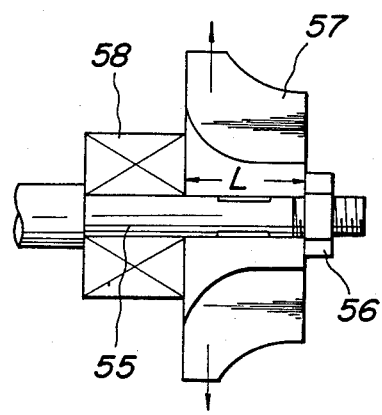

In actual use, when a compressor wheel 57 fitted to the compressor wheel-fitting shaft portion 55 by means of a thrust bearing 58 and a tightening nut 56 as shown in FIG. 7 is rotated at a high speed, the compressor wheel 57 is elongated in an arrow direction in this figure, that is, outwardly in a radial direction. Consequently, a distance L of the compressor wheel 57 in this figure shortens. Thus, it has been necessary that the fitting shaft 55 was elastically elongated by means of the tightening nut 56 by a shortened amount of the distance L when the compressor wheel 57 was assembled. However, when the hardness of the compressor wheel-fitting shaft 55 is high as in the conventional case, the fitting shaft 55 cannot allow a necessary amount of the elastic deformation. Thus, there exists a defect that the shrink amount cannot be absorbed, and the compressor wheel 57 slackens during use.

SUMMARY OF THE INVENTION

It is an object of the present invention to obviate the above-mentioned problem, and to provide a turbine rotor which can always afford stable performances while a compressor wheel and a fitting shaft thereof do not slacken even under rotation at high speeds.

The turbine rotor according to the present invention is constituted by a turbine vane wheel made of ceramics, a ceramic shaft integrally formed with the vane wheel, and a metallic shaft bonded to the ceramic shaft. The hardness of a part of or the whole part of the compressor wheel-fitting shaft portion of the metallic shaft is smaller than that of a part of the metallic shaft at a location near the turbine vane wheel side apart from the compressor wheel-fitting shaft portion.

The turbine rotor-producing method according to the present invention is directed to a method of producing a turbine rotor constituted by the ceramic turbine vane wheel, a ceramic shaft integrally formed with the vane wheel and a metallic shaft bonded to the ceramic shaft, and is characterized by subjecting a portion of the metallic shaft located on the turbine vane wheel side apart from the compressor wheel-fitting shaft portion to a hardening treatment such as high frequency induction hardening or ion nitriding before or after the metallic shaft is bonded to the ceramic shaft, thereby rendering the hardness of said portion larger than that of the compressor wheel-fitting shaft portion.

Another turbine rotor-producing method according to the present invention is directed to a method of producing a turbine rotor constituted by a ceramic turbine vane wheel, a ceramic shaft integrally formed with the vane wheel and a metallic shaft bonded to the ceramic shaft, and is characterized in that a part of or the whole part of the metallic shaft is constituted by a precipitation hardenable type alloy, the part of the metallic shaft constituted by the precipitation hardenable alloy is hardened through precipitation hardening treatment after the metallic shaft is bonded to the ceramic shaft, and then a part of or the whole part of the compressor wheel-fitting shaft portion of the metallic shaft is softened under reheating to a solution treatment temperature to make the hardness of a part of or the whole part of the compressor wheel-fitting shaft portion smaller than that of a portion of the metallic shaft located on the turbine vane wheel side apart from said part of the compressor wheel-fitting shaft portion.

According to the present invention, since the hardness of a part of or whole part of the compressor wheel-fitting shaft portion of the metallic shaft is made smaller than that of a portion of the metallic shaft located on the turbine vane wheel side, the fitting shaft can be elastically deformed by means of a tightening nut by a shrink amount of the compressor wheel to be caused under rotation at high speeds, when the compressor wheel is attached to the metallic shaft.

In order to constitute the turbine rotor in such a manner, according to the present invention, the metallic member is adjusted to a given hardness, and then before or after the ceramic member and the metallic member are bonded together, a portion of the metallic member on the turbine vane wheel side is hardened by means of the high frequency induction hardening or the like, or alternatively the whole portion of the metallic member is hardened through aging and subsequently a part of or the whole part of the compressor wheel-fitting shaft portion is softened through solution treatment.

The hardness of the compressor wheel-fitting shaft portion is properly in a range of from Hv 250 to Hv 400 in Vicker's hardness. If the hardness is smaller than Hv 250, sufficient strength of the fitting shaft cannot be obtained, while if it is larger than Hv 400, the elastic